Figure 1:
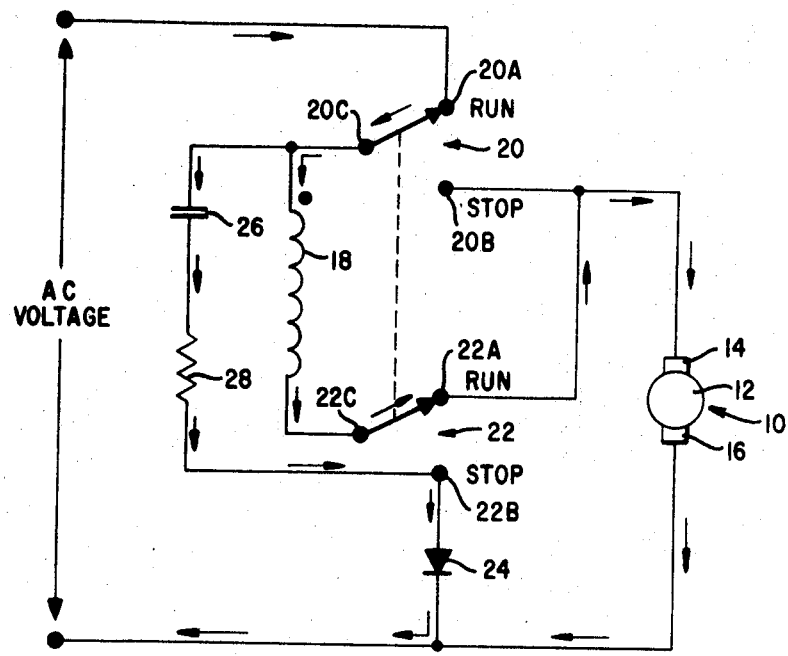

United States Patent

Hardin

[15] 3,673,481

[45] June 27, 1972

[54] DYNAMIC BRAKING FOR UNIVERSAL MOTORS

[72] Inventor: James T. Hardin, Lambertville, Mich.
[73] Assignee: Eltra Corporation, Toledo, Ohio
[22] Filed: May 20, 1970
[21] Appl. No.: 39,098

[52] U.S. Cl............................................318/246, 318/251
[51] Int. Cl. ............................................H02p 3/24
[58] Field of Search..................318/246, 251, 373, 375, 257, 318/269

[56] References Cited

UNITED STATES PATENTS 3,344,328   9/1967   Morris....................................318/269
1,025,877   5/1912   Lang........................................318/251
3,007,100   10/1961  Bettcher..................................318/251

Primary Examiner—Harold Broome
Assistant Examiner—W. E. Duncanson, Jr.
Attorney—D. Henry Stoltenberg

[57] ABSTRACT

A dynamic braking system for universal electric motors operating on alternating current is disclosed which utilizes the discharge of a condenser to momentarily energize the series field of the motor after the power circuit to the motor is broken and the field connected accross the terminals of the rotating armature to initiate dynamically braking of the armature to bring it to a stop within a few revolutions.

5 Claims, 2 Drawing Figures

INVENTOR.
JAMES T. HARDIN

DYNAMIC BRAKING FOR UNIVERSAL MOTORS

In many applications using a universal motor operating on alternating current such as the normal home power circuits for either 110 or 220 volts, it is very desirable to stop the motor quickly without allowing the rotating armature to coast to a stop by friction which may take as much time as 30 seconds. This is particularly true when the universal motor is !used to drive a rotary lawn nower where the coasting of the mower blades may give rise to dangerous conditions for the operator.

The present invention contemplates the provision of a method of dynamically braking a universal motor which is reliable and economical to manufacture, particularly for use with rotary lawn mowers.

It is therefore a principal object of this invention to provide a dynamic brake for a universal electric motor operating on alternating current which is suitable for use on rotary electric lawn mowers.

It is a further object of this invention to provide a reliable dynamic brake for a universal electric motor which is economical to manufacture.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Figure 2:
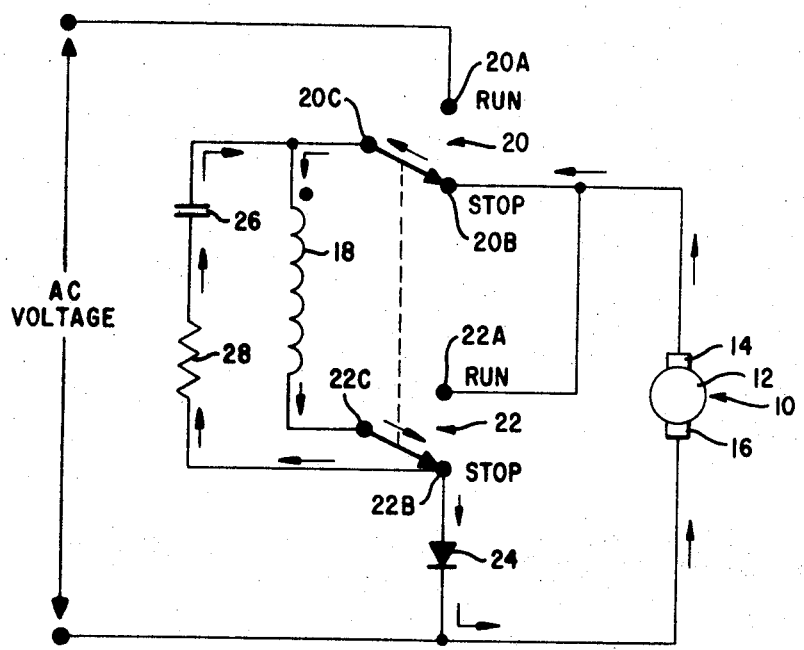

FIG. 1 is a schematic diagram of connections of a universal motor in the "run" position incorporating a dynamic braking system, and FIG. 2 is the same diagram with the connections to the motor in "stop" position.

Referring to FIG. 1 of the drawings, a universal motor 10 is shown schematically, which consists of an armature 12 with brushes 14 and 16 cooperating with a commutator. A series field coil 18 cooperates with the armature and is controlled by a pair of single-pole, double-throw switches 20 and 22. The poles of the switches are mechanically connected so that they are adapted to be manually operated at the same time to occupy an upper "run" position as shown in FIG. 1 or a lower "-stop" position as shown in FIG. 2. A double-pole, double-throw switch may also be used in place of the switches 20 and 22. The field coil 18 is connected directly across the terminals 20C and 22C of the switches 20 and 22, so that when the switches are in "run" position as shown in FIG. 1, the field coil 18 is connected in series with the armature 12 as shown. This is the normal operating condition for the universal motor.

For normal operation, the terminal 20A of the switch 20 is connected to one of the A.C. power lines, while the terminal 20B is connected to the brush 14 and also to the terminal 22A of the other switch 22. The other terminal 22B is connected to one side of a rectifier 24 while the other side of the rectifier is connected to the second A.C. power line and the brush 16 of the motor armature 12.

A condenser 26 is provided to be charged from the A.C. lines, being connected to the terminal 20C, which when the switches are in "run" position connects the condenser to one of the power lines, while the other side of the condenser is connected to the terminal 22B through a resistor 28 so that it is connected directly across the power lines with the rectifier 24 providing single polarity for charging of the condenser. With the switches 20 and 22 in "run" position, the condenser 26 is charged to peak line voltage through the resistor 28 and the rectifier 24. When the universal motor 12 is operating normally with the connection as shown in FIG. 1, the condenser 26 is fully charged within a few cycles of the A.C. line voltage.

When the motor operation is to be terminated, the operator moves the switches 20 and 22 to the position shown in FIG. 2 which breaks the power circuit between the A.C. power lines and the motor and connects the field 18 and the diode 24 directly across the brushes of the armature which is still rotating from its momentum attained during normal operation of the motor. This kinetic energy stored in the rotating armature must be dissipated for the motor armature to stop. In order to more quickly dissipate the energy, and bring the armature to a stop, dynamic braking is employed whereby the motor is connected to act as a self exciting generator which dissipates the energy as heat in the armature and field windings.

The series field 18 has relatively low resistance and when connected directly across the brushes 14 and 16 of the armature, it acts as a heavy electrical load on the armature and if an initial magnetic field can be built up. the armature will act as a generator to create a current flow through the field, to sustain the magnetic field and quickly dissipate the kinetic energy of rotation of the armature as heat. The charge on the condenser 26 is used for the purpose of creating the initial magnetic field by the field coil 18 by passing a current pulse through the field in a discharge circuit as shown in FIG. 2. The necessity for an initial pulse is dictated by the chance that the motor might be turned off at an instant in the A.C. cycle when the magnetic field has zero magnitude. It will be noted that the condenser 26 and the resistor are connected directly across the field coil 18 and also across the armature 12, with the polarity of the discharge current such that the voltage generated by the armature will maintain the current flow in the field winding. The rectifier 24 isolates the armature winding from the current discharge into the field and thereby reduces the amount of electrical energy that must be stored on the capacitor 26 necessary to provide dynamic braking.

It is to be understood that the above detailed description of the present invention is intended to disclose an embodiment thereof to those skilled in the art, but that the invention is not to be construed as limited in its application to the details of construction and arrangement of parts illustrated in the accompanying drawing since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

I claim:

1. In a universal motor having a commutator and a field coil adapted for operation from a source of alternating current, means for dynamically braking the armature of the motor comprising a condenser and a rectifier and switching means, said switching means in a "run" position, connecting the field coil in series with the armature across the source of alternating current and the condenser and rectifier across the source of alternating current, and a second "stop" position of the switching means, connecting the field and the rectifier across the armature and the condenser across the field, whereby the condenser is charged to peak line voltage of the source of alternating current during the "run" position, and discharged as a pulse across the field in the "stop" position to dynamically brake the armature to a standstill.

2. The connections for the universal motor of claim 1 further characterized by the polarities of the condenser and the rectifier being such that the condenser is discharged only through the field circuit when the switching means is in the "-stop" position.

3. The device defined in claim 1 further characterized by the switching means being a double-pole, double-throw switch.

4. The method of dynamically braking a universal motor having a armature with a commutator and a series field adapted to be energized from a source of alternating current, comprising connecting the armature in series with the field for normal operation with a condenser and a rectifier connected across the source of alternating current, thereafter disconnecting the field from the series relation with the rotating armature and connecting the field in parallel with the armature and in series with the rectifier to act as an electrical load on the armature, while connecting the charged condenser across the field to discharge the condenser as a pulse through the field to create an initial excitation for the field to initiate dynamic braking of the rotating armature to bring it to a standstill.

5. The method defined in claim 4 further characterized by a bucking voltage relation between the charged condenser and the rotating armature before initiation of dynamic braking.

* * * * *